(12) United States Patent
Muraoka et al.

(10) Patent No.: US 7,438,994 B2
(45) Date of Patent: Oct. 21, 2008

(54) NON-AQUEOUS ELECTROLYTE SECONDARY BATTERY

(75) Inventors: Yoshiyuki Muraoka, Osaka (JP);
Takuya Nakashima, Osaka (JP);
Kiyomi Kouzuki, Osaka (JP);
Masatoshi Nagayama, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 13 days.

(21) Appl. No.: 11/505,488

(22) Filed: Aug. 17, 2006

(65) Prior Publication Data
US 2007/0042274 A1    Feb. 22, 2007

(30) Foreign Application Priority Data
Aug. 17, 2005    (JP)    ............................. 2005-236276

(51) Int. Cl.
*H01M 6/16*    (2006.01)
(52) U.S. Cl. ................. 429/332; 429/330; 429/231.1; 429/231.2; 429/231.3; 429/231.4; 429/231.8; 429/231.5; 429/221; 429/223; 429/224; 429/164
(58) Field of Classification Search ................. 429/332, 429/330, 231.1, 231.2, 231.3, 231.4, 231.8, 429/231.5, 221, 223, 224, 164
See application file for complete search history.

(56) References Cited

U.S. PATENT DOCUMENTS

| 6,641,953 | B2 * | 11/2003 | Takeuchi et al. | ......... 429/231.3 |
| 2006/0040184 | A1 * | 2/2006 | Okamoto | ................. 429/231.1 |
| 2006/0269846 | A1 * | 11/2006 | Xu et al. | ..................... 429/329 |

FOREIGN PATENT DOCUMENTS

| CA | 2 334 054 | * | 3/2002 |
| EP | 0 622 862 A1 | | 11/1994 |
| JP | 7-014607 | | 1/1995 |
| JP | 7-45304 | | 2/1995 |
| JP | 2004-342626 | * | 12/2004 |

* cited by examiner

*Primary Examiner*—Laura S Weiner
(74) *Attorney, Agent, or Firm*—McDermott Will & Emery LLP (57) ABSTRACT

A non-aqueous electrolyte secondary battery has a positive electrode, a negative electrode, a separator, and a non-aqueous electrolyte solution. The positive electrode has a theoretical capacity per unit area from 3.0 to 4.5 mAh/cm$^2$. The non-aqueous electrolyte solution contains ethylene carbonate (EC), ethylmethyl carbonate (EMC), and dimethyl carbonate (DMC) as solvents, and LiPF$_6$ as an electrolyte, with volume ratios from 10 to 20% for EC, 10 to 20% for EMC, and 60 to 80% for DMC relative to all the solvents in the electrolyte solution. The concentration of the LiPF$_6$ is from 1.30 to 1.50 mol/L.

7 Claims, 1 Drawing Sheet

FIG. 1

NON-AQUEOUS ELECTROLYTE SECONDARY BATTERY

BACKGROUND OF THE INVENTION

1. Field of the Invention

The present invention relates to a non-aqueous electrolyte secondary battery, and more particularly to a non-aqueous electrolyte secondary battery for use in a high rate having superior battery characteristics under low temperature.

2. Description of the Related Art

A non-aqueous electrolyte secondary battery represented by a lithium ion secondary battery is a power source having a high energy density and a high voltage. In view of this, the non-aqueous electrolyte secondary battery is utilized as a main power source of a mobile device such as a mobile communication device or a portable electronic device. Also, in recent years, the non-aqueous electrolyte secondary battery has been used as an automobile power source or a power source for a DC-driven large-sized machine tool. In view of this, there is a demand for a compact and lightweight lithium ion secondary battery capable of fast charging and large current discharging.

On the other hand, the lithium ion secondary battery has to overcome the problems resulting from overcharging, external short-circuiting, or internal short-circuiting. In particular, lithium metal deposition may likely appear on a negative electrode surface at the time of fast charging or large current discharging. As a result, large exothermic reaction may occur in the lithium ion secondary battery during a nail penetration test, which is one of reliability tests, for instance. As a measure for the problem, a current control means using a voltage and/or a temperature is provided in an assembled battery. Also, a PTC thermistor and a current interruption mechanism are equipped in a unit cell battery.

There is a case, however, that removal of the PTC thermistor as a high resistor is required in order to secure a higher power from the lithium ion secondary battery. In such a case, the lithium ion secondary battery lacks one mechanism as a countermeasure against the lithium metal deposition. It is necessary to devise the material for internal parts of the battery and the battery layout to make up for the loss. From this point of view, the present inventors have considered use of a non-aqueous electrolyte solution that is less likely to cause lithium metal deposition on a negative electrode surface even in a high power condition.

Use of a non-aqueous electrolyte solution in a non-aqueous electrolyte secondary battery is proposed e.g. in Japanese Unexamined Patent Publications No. 7-14607 (D1) and No. 7-45304 (D2), although the non-aqueous electrolyte solutions disclosed in the publications are not used to suppress lithium metal deposition in a high power condition. D1 discloses improvement on cycle characteristic by using a non-aqueous electrolyte solution containing a mixed solvent of ethylmethyl carbonate (hereinafter, called as "EMC") and dimethyl carbonate (hereinafter, called as "DMC"). D2 discloses improvement on discharge characteristic under a high temperature environment by using a non-aqueous electrolyte solution containing a mixed solvent of ethylene carbonate (hereinafter, called as "EC"), EMC, and DMC. Use of the non-aqueous electrolyte solutions containing the mixed solvents as disclosed in the publications could be proposed to suppress lithium metal deposition in a high power condition.

However, according to a detailed investigation by the inventors, use of the non-aqueous electrolyte solutions proposed in the publications failed to suppress lithium metal deposition even at room temperature if the secondary batteries carrying the non-aqueous electrolyte solutions are used in severe specifications (hereinafter, sometimes called as "high rate specifications") such as a continuous discharge with a large current of 0.1 hour rate, or a constant power discharge with a high power of 100 W or more, or a fast charge with a large current of 0.5 hour rate, which is required to the battery for use in an automotive vehicle or a large-sized machine tool. Therefore, it is presumed that the tendency toward the lithium metal deposition will become pronounced in charging or discharging the battery at a low temperature of 0° C. or below, which would be a case when an automotive vehicle or a large-sized machine tool loaded with the battery is used in cold climates.

Specifically, the investigation by the inventors confirmed that neither the battery using the non-aqueous electrolyte solution, as disclosed in D1, satisfying the formula: $3/10 \leq (M+D)/T \leq 7/10$ where T is the total volume of the non-aqueous solvents, M is the volume of EMC, and D is the volume of DMC, nor the battery using the non-aqueous electrolyte solution, as disclosed in D2, with volume ratios of EC, EMC, and DMC relative to the all non-aqueous solvents being respectively from 30 to 50% for EC, 10 to 50% for DMC, and 10 to 50% for EMC, has satisfactorily succeeded in solving the aforementioned problem under a large current discharge of 0.07 hour rate at room temperature. Further, the result leads to an estimation that the battery will cause the same or similar problem in use under the low temperature condition.

SUMMARY OF THE INVENTION

In view of the above problems residing in the prior art, it is an object of the present invention to provide a secondary battery with a non-aqueous electrolyte solution that enables to suppress lithium metal deposition even in a severe environment corresponding to a high-rate charging and discharging, or discharging while achieving a high power in a low temperature condition, and consequently, to provide a non-aqueous electrolyte secondary battery having superior battery characteristics in high rate specifications.

An aspect of the invention is directed to a non-aqueous electrolyte secondary battery comprising a positive electrode, a negative electrode, a separator, and a non-aqueous electrolyte solution. The positive electrode has a theoretical capacity per unit area from 3.0 to 4.5 mAh/cm². The non-aqueous electrolyte solution contains ethylene carbonate (EC), ethylmethyl carbonate (EMC), and dimethyl carbonate (DMC), as solvents, and $LiPF_6$ as an electrolyte, with volume ratios from 10 to 20% for EC, 10 to 20% for EMC, and 60 to 80% for DMC relative to all the solvents in the electrolyte solution. The concentration of the $LiPF_6$ is from 1.30 to 1.50 mol/L.

These and other objects, features and advantages of the present invention will become more apparent upon reading the following detailed description along with the accompanying drawing.

DETAILED DESCRIPTION OF THE PREFERRED EMBODIMENTS

A non-aqueous electrolyte secondary battery shows an idealistic battery reactivity when the moving velocity (α) of lithium ions in an electrolyte solution and the reaction velocity (β) of lithium ions in a positive electrode are kept in a balanced state. In a secondary battery used in high rate specifications having such a large electrode area to attain a theoretical capacity per unit area of the positive electrode from 3.0 to 4.5 mAh/cm², the value "β" is excessively increased, which may resultantly lead to the insufficient supply of lithium ions as compared with the reaction of lithium ions, namely, β>α. As a result, the balanced state may be lost.

The following finding was obtained through investigation of an electrolyte solution that enables to retain the balance even by high-rate charging and discharging, or high-power discharging at a low temperature of 0° C. or below.

In a non-aqueous electrolyte secondary battery used in high-rate specifications, increasing the value "α" enables to keep a balance with the excessively large "β". In order to increase the value "α", lowering the viscosity of the non-aqueous electrolyte solution is effective. DMC is a non-aqueous solvent having a low viscosity. Therefore, increasing the content of the low viscous DMC in the non-aqueous electrolyte solution is effective in lowering the viscosity of the non-aqueous electrolyte solution. On the other hand, the melting point of DMC is relatively as high as about 3° C. Therefore, the non-aqueous electrolyte solution containing DMC may likely to coagulate due to the effect of DMC having the high-melting point. Increasing the concentration of the electrolyte i.e. $LiPF_6$ in the non-aqueous electrolyte solution is effective in suppressing the coagulation. Increasing the concentration of $LiPF_6$ enables to lower the coagulation point of the non-aqueous electrolyte solution. Lowering the coagulation point of the non-aqueous electrolyte solution enables to further increase the value "α" even in a low temperature condition.

The above aspect of the invention has been made based on the above finding regarding the synergy effects obtained from the properties of the specific non-aqueous solvents, and the property of the specific electrolyte.

In the following, an embodiment of the invention is described in detail.

A non-aqueous electrolyte secondary battery as the embodiment of the invention comprises a positive electrode, a negative electrode, a separator, and a non-aqueous electrolyte solution. The positive electrode has a theoretical capacity per unit area from 3.0 to 4.5 mAh/cm². The non-aqueous electrolyte solution contains EC, EMC, and DMC as solvents, and $LiPF_6$ as an electrolyte. The volume ratios of the three solvents relative to all the solvents in the non-aqueous electrolyte solution are 10 to 20% for EC, 10 to 20% for EMC, and 60 to 80% for DMC, respectively. The concentration of $LiPF_6$ is from 1.30 to 1.50 mol/L.

The positive electrode has the theoretical capacity per unit area from 3.0 to 4.5 mAh/cm², which is extremely small, as compared with a theoretical capacity per unit area from 5 to 10 mAh/cm² for a positive electrode of a conventional non-aqueous electrolyte secondary battery, which is used in low rate specifications for a mobile device or a like device. In other words, the embodiment of the invention is directed to a non-aqueous electrolyte secondary battery for use in high-rate specifications, comprising a positive electrode which has a predetermined large electrode area and a predetermined small thickness of a positive electrode mixture layer so as to attain a theoretical capacity per unit area from 3.0 to 4.5 mAh/cm².

Stable production of a positive electrode having a large electrode area with a theoretical capacity per unit area smaller than 3.0 mAh/cm² may be difficult, considering a point that a current collector carries thereon a uniformly dispersed positive electrode active material, because a positive electrode mixture layer containing the positive electrode active material has an unduly small thickness. On the other hand, a positive electrode having a small electrode area with a theoretical capacity per unit area exceeding 4.5 mAh/cm² may unduly lower battery characteristics in the high-rate specifications. Therefore, if the theoretical capacity of the positive electrode exceeds the above upper limit, a secondary battery with such a positive electrode no longer serves as a secondary battery for use in high-rate specifications, thereby losing the advantageous effects of the invention.

A positive electrode with a theoretical capacity per unit area from 3.0 to 4.5 mAh/cm² can be produced as the following positive electrode: the thickness of the positive electrode mixture layer is from 30 to 100 μm, and the content of the positive electrode active material in the positive electrode mixture layer is from 75 to 95% by mass, if the positive electrode mixture layer contains, for instance, a lithium-nickel-manganese-cobalt-based oxide as the positive electrode active material.

The kind of the positive electrode active material is not specifically limited, as far as the positive electrode active material is a well-known conventional positive electrode active material capable of lithium ion storing/releasing and containing a sufficient amount of lithium. A preferred example of the positive electrode active material is a lithium-containing composite oxide expressed by $LiM_xO_y$, where x and y satisfy $1 \leq x \leq 2$ and $2 \leq y \leq 4$, and M is at least one selected from the group consisting of Co, Ni, Mn, Fe, Al, V, and Ti. Examples of the positive electrode active material include lithium-containing composite oxides expressed by general formulae: $LiMO_2$ and $LiM_2O_4$ where M is at least one selected from the group consisting of Co, Ni, Mn, Fe, Al, V, and Ti. The positive electrode active material may include interlayer compounds containing lithium, and a like compound. These positive electrode active materials may be used alone or in combination.

The positive electrode used in the embodiment is produced, for instance, by admixing a binder, a conductive agent, and a thickener, according to needs, in addition to the positive electrode active material, using a solvent to yield a positive electrode mixture paste; coating the positive electrode mixture paste on a current collector; drying; rolling; and cutting into a predetermined shape.

The binder to be added to the positive electrode mixture paste may be any one of a thermoplastic resin and a thermoset resin. Examples of the binder include polyethylene, polypropylene, polytetrafluoroethylene, polyvinylidene fluoride, and styrene butadiene rubber. These materials may be used alone or in combination.

An electron conductive material can be used as the conductive agent to be added to the positive electrode mixture paste. Examples of the electron conductive material include: graphites such as natural graphite, synthetic graphite, and exfoliated graphite; carbon blacks such as acetylene black and ketjen black; conductive fibers such as carbon fibers and metallic fibers; metallic powders such as copper powders and nickel powders; and organic conductive materials such as polyphenylene derivatives. These materials may be used alone or in combination. The amount of the conductive agent is not specifically limited as far as the addition does not impair the effects of the invention.

Examples of the thickener to be added to the positive electrode mixture paste are well-known compounds such as carboxymethyl cellulose (CMC).

An organic solvent such as N-methyl-2-pyrrolidone (NMP) can be used as the solvent for producing the positive electrode mixture paste, but is not limited thereto.

A preferred material for the positive electrode current collector is aluminum (Al) or an aluminum alloy in the aspect of cost reduction, processability, and physical/chemical stability. Alternatively, a material such as titanium (Ti), stainless steel (SUS), carbon, or a conductive resin may be used. Further, a material obtained by processing a surface of Al or SUS with carbon or Ti may be used. The surfaces of these materials may be oxidized. Further alternatively, asperities may be formed on the surface of the positive electrode current collector by surface processing. Further alternatively, a thin film of aluminum or titanium may be formed on a resin sheet such as a polyethylene terephthalate (PET) sheet by vapor deposition or a like technique. The thickness of the positive electrode current collector is not specifically limited, but preferably is in the range of 10 to 50 μm.

The manners of coating the mixture paste onto the positive electrode current collector, drying, and rolling are not specifically limited. The mixture paste obtained by the mixing and the dispersion can be easily coated with use of a slit die coater or a like device. Natural drying is preferred. However, it is preferable to dry the coat at a temperature of 70° C. to 200° C. considering productivity. Rolling may be carried out by a roll press machine, for instance.

Rolling can be performed while controlling the thickness of the positive electrode mixture layer. In the rolling, it is preferred to set the pore volume ratio of the positive electrode mixture layer from 24 to 31%. Pores in the positive electrode mixture layer enhance reactivity of lithium ions on the positive electrode plate, and consequently, improve large current discharge performance. If the pore volume ratio is less than 24%, diffusion resistance of lithium ions in the positive electrode is increased, which may likely to degrade discharge characteristic. If the pore volume ratio exceeds 31%, electron resistance between the active materials is increased, which may also likely degrade discharge characteristic.

A further preferred pore volume ratio is from 26 to 29%. With the preferred pore volume ratio, the reactivity of lithium ions can be further enhanced, thereby remarkably improving large current discharge performance.

The pore volume ratio is calculated as follows, for instance. Assuming that "VA" represents a theoretical volume obtained based on the components constituting the positive electrode mixture layer, and the composition ratios thereof (namely, the pore volume is zero), and "VB" represents an actual volume of the positive electrode mixture layer calculated from a thickness and an area of the positive electrode mixture layer, the pore volume ratio is calculated according to $\{(VB-VA)/VB\} \times 100$ (vol. %).

The non-aqueous electrolyte solution contains EC, EMC, and DMC as solvents. EC is capable of dissociating a large amount of the electrolyte i.e. $LiPF_6$ due to its high polarity. In addition, EC has a high dielectric constant, and a high oxidation resistance. EMC is advantageous in suppressing coagulation of the non-aqueous electrolyte solution because of its very low melting point of $-55°$ C. DMC has a low viscosity as mentioned above, and accordingly, is capable of raising the moving velocity of lithium ions in the electrolyte solution.

The volume ratios of EC, EMC, and DMC relative to all the solvents in the non-aqueous electrolyte solution are respectively 10 to 20% for EC, 10 to 20% for EMC, and 60 to 80% for DMC.

Addition of EC of less than 10% in volumetric ratio leads to insufficient dissociation of $LiPF_6$ which degrades discharge characteristic, and also deteriorates storage characteristic of the non-aqueous electrolyte solution due to the lowered oxidation resistance. Addition of EC exceeding 20% in volumetric ratio may increase the viscosity of the electrolyte solution, thereby degrading discharge characteristic. Addition of EMC of less than 10% in volumetric ratio may likely coagulate the electrolyte solution under a low temperature condition. Addition of EMC exceeding 20% in volumetric ratio may increase the viscosity of the electrolyte solution, thereby degrading discharge characteristic. Also, addition of DMC of less than 60% in volumetric ratio may lose the advantageous effects of the invention of lowering the viscosity of the electrolyte solution to increase the moving velocity of lithium ions in the electrolyte solution. Addition of DMC exceeding 80% in volumetric ratio may cause intolerable coagulation of DMC in a low temperature condition.

In view of the above, the volume ratios of the above three solvents relative to all the solvents in the non-aqueous electrolyte solution are preferably from 12 to 18% for EC, 12 to 18% for EMC, and 65 to 75% for DMC, and more preferably, from 14 to 16% for EC, 14 to 16% for EMC, and 68 to 72% for DMC.

The non-aqueous electrolyte solution used in the embodiment is prepared by admixing the above three solvents with the respective volume ratios. However, as far as the advantageous effects of the invention are secured, it is possible to add other carbonate-based non-aqueous solvent, according to needs, in addition to the above three solvents. An example of the other carbonate-based non-aqueous solvent is propylene carbonate (PC). The other carbonate-based non-aqueous solvents may be used alone or in combination. The volume ratio of the other carbonate-based non-aqueous solvent may preferably be less than 20% relative to all the solvents in the non-aqueous electrolyte solution to secure the effects of the above three solvents, and more preferably 5% or less, and most preferably 0%.

Also, it is possible to add an additive to the non-aqueous electrolyte solution according to needs. Examples of the additive include carbonates such as vinylene carbonate (VC) and vinylethylene carbonate (VEC), and phosphates. These additives may be used alone or in combination. The concentration of the additive is preferably from 0% to 20% by mass.

The non-aqueous electrolyte solution contains $LiPF_6$ as an electrolyte. $LiPF_6$ is chemically stable and has high dissociability. In addition, $LiPF_6$ optimizes the balance between the moving velocity of lithium ions in the electrolyte solution and the reaction velocity of lithium ions in the positive electrode in cooperation with the effects of the above three solvents.

The concentration of $LiPF_6$ in the non-aqueous electrolyte solution is from 1.30 to 1.50 mol/L, and preferably from 1.35 to 1.45 mol/L. Addition of $LiPF_6$ with a concentration of less than 1.30 mol/L fails to provide the advantageous effects of the invention. On the other hand, addition of $LiPF_6$ with a concentration exceeding 1.5 mol/L unduly increases the viscosity of the non-aqueous electrolyte solution, which lowers the moving velocity of lithium ions in the electrolyte solution, thereby degrading battery characteristics.

In the non-aqueous electrolyte solution used in the embodiment, as far as the effects of $LiPF_6$ are not impaired, other lithium salt may be added as the electrolyte. Examples of the other lithium salt are $LiClO_4$, $LiAlCl_4$, $LiSbF_6$, $LiSCN$, $LiCl$, $LiCF_3SO_3$, $LiCF_3CO_2$, $Li(CF_3SO_2)_2$, $LiAsF_6$, $LiBF_4$, and $LiN(CF_3SO_2)_2$. The amount of the other lithium salt is preferably 10% or less in molar ratio relative to the molar amount of $LiPF_6$, and more preferably 5% or less, and most preferably 0%.

The negative electrode used in the embodiment includes a current collector, and a negative electrode mixture layer containing a negative electrode active material.

It is preferred to use a carbon material as the negative electrode active material. The carbon material is a chemically most stable material among the materials capable of storing and releasing lithium ions. Use of the carbon material allows for maintaining life property at a high level. Examples of the carbon material are non-graphitizable carbon materials such as cokes or glassy carbons, and graphites made of a high crystalline carbon material with developed crystalline structure. Specific examples of the carbon material are pyrolytic carbons: cokes such as pitch coke, needle coke, and petroleum coke; graphites; glassy carbons, sintered organic polymeric compounds such as a carbonized material produced by sintering a phenol resin, a furan resin, or a like resin at a proper temperature; carbon fibers; and activated carbons. It is preferable to use a crystalline or amorphous metal oxide or a like compound, as the negative electrode active material, in addition to the carbon material.

In the case where the carbon material is used as the negative electrode active material, the capacity value "A/B" of the negative electrode is preferably from 220 to 290 mAh/g where A is the capacity of the battery, and B is the weight of the carbon material. The capacity value "A/B" of the negative electrode is an index capable of maintaining battery characteristics while suppressing lithium metal deposition on the negative electrode surface. Accordingly, control of the capacity value "A/B" enables to maintain both battery reliability and battery characteristics at satisfactorily high levels.

If the capacity value "A/B" is less than 220 mAh/g, the excessive content of the negative electrode active material may increase the thickness of the negative electrode. Thereby, the moving velocity of lithium ions in the negative electrode active material near the current collector is lowered, which may likely degrade battery characteristics, and likely cause lithium metal deposition. On the other hand, if the capacity value "A/B" exceeds 290 mAh/g, a property of the negative electrode for accepting lithium ions is lowered, which may likely degrade discharge characteristic.

More preferably, the capacity value "A/B" is from 230 to 270 mAh/g, which enables to keep both battery reliability and battery characteristics at sufficiently high levels.

The negative electrode used in the embodiment is produced, for instance, by admixing a binder, as well as a conductive agent and a thickener according to needs, in addition to the negative electrode active material, using a solvent such as NMP for dispersion to yield a negative electrode mixture paste; coating the negative electrode mixture paste on a copper current collector to a predetermined thickness; drying; rolling; and cutting into a predetermined shape.

Examples of the binder to be added to the negative electrode mixture paste are well-known materials such as polyethylene, polypropylene, polytetrafluoroethylene, polyvinylidene fluoride, and styrene butadiene rubber.

The conductive agent to be added to the negative electrode mixture paste may be the electron conductive material identical to the one used as the conductive agent to be added to the positive electrode mixture paste. Also, the thickener to be added to the negative electrode mixture paste may be the thickener identical to the one such as CMC to be added to the positive electrode mixture paste.

The non-aqueous electrolyte secondary battery in the embodiment includes an electrode assembly comprised of the aforementioned positive electrode, the aforementioned negative electrode, and a separator disposed between the positive and negative electrodes.

Preferably, the separator has a thickness from 18 to 25 μm. The separator with a thickness of less than 18 μm may likely degrade battery characteristics as the retention force for the non-aqueous electrolyte solution is lowered. The separator with a thickness over 25 μm may likely lower the battery capacity per unit volume. In view of this, keeping the separator thickness from 18 to 25 μm enables to maintain both the battery capacity and the battery characteristics at sufficiently high levels.

A preferred example of the separator is a microporous resin film having a melting point of 200° C. or lower. Particularly preferred examples of the separator are polyolefin resin materials, among which polyethylene, polypropylene, a mixture of polyethylene and polypropylene, and a copolymer thereof are more preferable. In the case where a battery provided with a separator made of the polyolefin resin material is externally short-circuited, the separator is melted, which increases a battery resistance, and resultantly reduces a short-circuit current. This enables to prevent an exothermic reaction of the battery and thus, an unduly high temperature state of the battery.

Preferably, the electrode assembly is fabricated by rolling up the positive electrode in the form of a strip and the negative electrode in the form of a strip for a certain number of times in their longitudinal directions, with the separator being disposed therebetween. Preferably, the electrode assembly is shaped into a cylindrical structure. The electrode assembly may be shaped into other structure such as a prismatic shape, which is classified into a winding type and a layered type. The cylindrical electrode assembly is advantageous in providing the effects of the invention because a core portion of the battery in the winding direction is subjected to a stronger stress in charging and discharging.

The non-aqueous electrolyte secondary battery is, for example, fabricated by housing the aforementioned cylindrical electrode assembly in a battery can, with an insulating plate being placed on a bottom portion of the battery can. The material for the battery can may be Fe, Ni, stainless steel, Al, or Ti. It is preferable to plate the battery can or perform an equivalent process in order to prevent corrosion caused by an electrochemical reaction of the non-aqueous electrolyte solution in charging and discharging of the battery.

Figure 1:
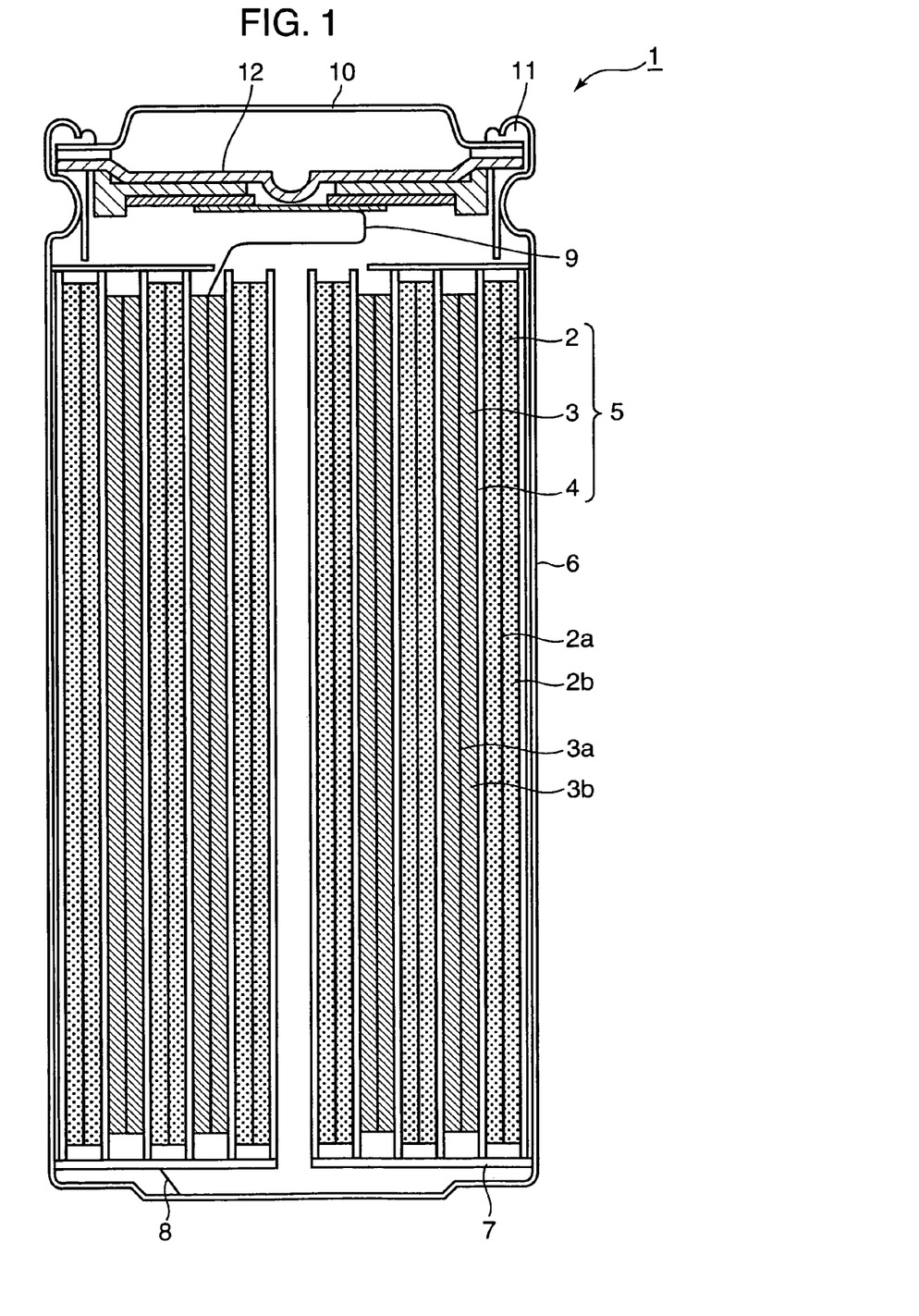
FIG. 1 is a schematic cross-sectional view showing an example of a non-aqueous electrolyte secondary battery embodying the invention.

The non-aqueous electrolyte secondary battery in the embodiment, provided with the positive electrode, the negative electrode, the separator, and the non-aqueous electrolyte solution, is constructed as shown in FIG. 1, for instance.

Referring to FIG. 1, the non-aqueous electrolyte secondary battery 1 includes a cylindrical electrode assembly 5, which is constructed by winding a strip-like negative electrode 2 and a strip-like positive electrode 3 in their longitudinal directions, with a separator 4 being disposed between the negative electrode 2 and the positive electrode 3. The negative electrode 2 has a negative electrode current collector 2a, and a negative electrode mixture layer 2b formed on the negative electrode current collector 2a. The positive electrode 3 has a positive electrode current collector 3a, and a positive electrode mixture layer 3b formed on the positive electrode current collector 3a. A negative electrode lead wire 8 is attached to the negative electrode 2, and a positive electrode lead wire 9 is attached to the positive electrode 3. The electrode assembly 5 is housed in a battery can 6, with an insulating plate 7 being placed on the bottom portion of the battery can 6. One end of the negative electrode lead wire 8 is electrically connected to the battery can 6, and one end of the positive electrode lead wire 9 is electrically connected to a battery lid 10 by way of a current interrupter in the form of a thin plate having a function of interrupting a current in accordance with an internal pressure of the battery. Into the battery can 6, poured is a non-aqueous electrolyte solution containing EC, EMC, and DMC as solvents with the aforementioned predetermined respective volume ratios, and containing $LiPF_6$ as an electrolyte with the aforementioned predetermined concentration. After the battery can 6 is caulked by way of an insulating sealing gasket 11, the battery lid 10 is fixed to the battery can 6. A safety valve device 12 is provided to release the air from the battery in case that the internal pressure of the battery exceeds a predetermined value.

The non-aqueous electrolyte solution in the embodiment makes it possible to cover a function of a PTC thermistor as a countermeasure against lithium metal deposition. Accordingly, the non-aqueous electrolyte secondary battery in the embodiment allows for removal of the PTC thermistor in accordance with its specifications.

Although the present invention has been described in terms of the presently preferred embodiment, such embodiment is illustrative in all aspects and is not to be interpreted as restrictive. It is to be understood that various alterations and modifications may be embodied without departing from the scope of the present invention.

In the following, some of the examples pertaining to the invention are illustrated. The invention, however, is not limited to the below-mentioned examples.

EXAMPLES

Example 1

A positive electrode was prepared as follows. $Li_2CO_3$, $Co_3O_4$, NiO, and $MnO_2$ of predetermined amounts were mixed so that $Li_{0.94}Ni_{0.35}Mn_{0.35}Co_{0.35}O_2$ was produced after sintering. The mixture was sintered at 900° C. for 10 hours, whereby a positive electrode active material was yielded. 100 parts by mass of the positive electrode active material, 2.5 parts by mass of acetylene black, 4 parts by mass of a fluorocarbon-resin-based binder, and a proper amount of a carboxymethyl-cellulose-containing aqueous solution were mixed by a double arm mixer, whereby a positive electrode mixture paste was yielded. The paste was coated on both surfaces of an aluminum foil of 30 μm in thickness, followed by drying, and rolling a thus obtained strip so that the resultant positive electrode had 99 μm in total thickness, 3.7 mAh/$cm^2$ in theoretical capacity per unit area, and 25% in pore volume ratio of the positive electrode mixture layer. After the rolling, the obtained strip was cut in dimensions of 52 mm in width and 1,660 mm in length, whereby the positive electrode was prepared.

A negative electrode was prepared as follows. Graphitized mesophase microbeads (hereinafter, called as "mesophase graphite") obtained by graphitizing mesophase microbeads at a high temperature of 2,800° C. was used as a negative electrode active material. 100 parts by mass of the negative electrode active material, 2.5 parts by mass of BM-400B (40 parts by mass in solid content), which was SBR (styrene butadiene rubber) modified with acrylic acid (manufactured by ZEON Corporation), 1 part by mass of carboxymethyl cellulose, and a proper amount of water were mixed by a double arm mixer, whereby a negative electrode mixture paste was yielded. The paste was coated on both surface of a copper foil of 0.02 mm in thickness, followed by drying and rolling a thus obtained strip so that the resultant negative electrode had 97 μm in total thickness, and 35% in pore volume ratio of the negative electrode mixture layer. After the rolling, the obtained strip was cut in dimensions of 57 mm in width and 1,770 mm in length was performed, whereby the negative electrode was prepared.

In a combination of the positive electrode with the negative electrode, the negative electrode has a capacity per unit mass of the negative electrode active material being 250 mAh/g after charging to 4.2 V.

Next, the positive electrode and the negative electrode were assembled in such a manner that an aluminum foil portion free of the positive electrode mixture paste of 2.5 mm in width was exposed at a longitudinal central portion of the positive electrode, and that a copper foil portion free of the negative electrode mixture paste of 2.5 mm in width was exposed at longitudinal both ends of the negative electrode. An aluminum lead wire of 10 mm in width and 0.1 mm in thickness was attached to the aluminum foil portion of the positive electrode by welding. Copper lead wires each of 3.0 mm in width were attached to the copper foil portions at the both ends of the negative electrode, respectively, by welding. Then, the positive electrode and the negative electrode were rolled up with a polyethylene separator of 59 mm in width and 20 μm in thickness disposed therebetween, into a cylindrical shape, whereby an electrode assembly was fabricated. The electrode assembly was housed in a battery case of 26 mm in diameter and 65 mm in height. Then, the aluminum lead wire attached to the positive electrode of the electrode assembly was fixed to a sealing plate by welding, and the two copper lead wires attached to the negative electrode were fixed to a bottom portion of the battery case by welding. Thereafter, poured was 13 g of a non-aqueous electrolyte solution dissolving $LiPF_6$ with a concentration of 1.40 mol/L into a mixed solvent of EC, EMC, and DMC with a volume ratio of 15:15:70. After a sealing process was conducted, a cylindrical non-aqueous electrolyte secondary battery of Example 1, with a nominal capacity of 2.6 Ah, was produced.

Examples 2 through 5

Non-aqueous electrolyte secondary batteries of Examples 2 through 5 were produced in the similar manner as Example 1 except that mixed solvents of EC, EMC, and DMC, with volume ratios of EC:EMC:DMC=10:15:75, 20:15:65, 15:10:75, and 15:20:65, were used as solvents for non-aqueous electrolyte solutions, respectively.

Examples 6 and 7

Non-aqueous electrolyte secondary batteries of Examples 6 and 7 were produced in the similar manner as Example 1 except that $LiPF_6$ was dissolved in non-aqueous electrolyte solutions with concentrations of 1.30 mol/L and 1.50 mol/L, respectively.

Examples 8 and 9

Non-aqueous electrolyte secondary batteries of Examples 8 and 9 were produced in the similar manner as Example 1 except that a thickness and a length of positive electrodes were adjusted so that theoretical capacities per unit area of the positive electrodes were 3.0 Ah/$cm^2$ and 4.5 mAh/$cm^2$, respectively.

Examples 10 through 13

Non-aqueous electrolyte secondary batteries of Examples 10 through 13 were produced in the similar manner as Example 1 except that thicknesses of negative electrodes were adjusted so that capacities of the negative electrodes per unit mass of the negative electrode active material were 200 mAh/g, 220 mAh/g, 290 mAh/g, and 300 mAh/g, respectively, while maintaining 35% in pore volume ratio of the negative electrode mixture layer.

Examples 14 through 17

Non-aqueous electrolyte secondary batteries of Examples 14 through 17 were produced in the similar manner as Example 1 except that polyethylene separators with thicknesses of 15 μm, 18 μm, 25 μm, and 30 μm were used, respectively.

Example 18

A non-aqueous electrolyte secondary battery of Example 18 was produced in the similar manner as Example 1 except that the thickness of a positive electrode mixture layer was adjusted by rolling so that a pore volume ratio of the positive electrode mixture layer was 30%.

Comparative Examples 1 through 4

Non-aqueous electrolyte secondary batteries of Comparative Examples 1 through 4 were produced in the similar manner as Example 1 except that mixed solvents of EC, EMC, and DMC, with volume ratios of EC:EMC:DMC=5:15:80, 25:15:60, 15:5:80, and 15:25:60, were used as solvents for non-aqueous electrolyte solutions, respectively.

Comparative Examples 5 and 6

Non-aqueous electrolyte secondary batteries of Comparative Examples 5 and 6 were produced in the similar manner as Example 1 except that $LiPF_6$ was dissolved in non-aqueous electrolyte solutions with concentrations of 1.20 mol/L and 1.60 mol/L, respectively.

Comparative Examples 7 and 8

Non-aqueous electrolyte secondary batteries of Comparative Examples 7 and 8 were produced in the similar manner as Example 1 except that a thickness and a length of positive electrodes were adjusted so that theoretical capacities per unit area of the positive electrodes were 2.5 Ah/cm² and 5.0 mAh/cm², respectively.

The non-aqueous electrolyte secondary batteries produced in Examples 1 through 18, and Comparative Examples 1 through 8 were evaluated concerning the following characteristics.

(Evaluation on Discharge Characteristic)

After charging to a charged voltage of 4.2 V with a constant current of 10 A under an environment of −5° C., a constant voltage charge was performed at a constant voltage of 4.2 V until a terminal current of 0.26 A. After batteries were hold for 20 minutes in the same environment, a constant current discharge was performed at a constant current of 20 A until a terminal voltage of 2.0 V. Then, after charging to a charged voltage of 4.2V at a constant current of 10A under an environment of 20° C., a constant voltage charge was performed at a constant voltage of 4.2 V until a terminal current of 0.26 A. After batteries were hold for 20 minutes in the same environment, a constant current discharge was performed at a constant current of 20 A until a terminal voltage of 2.0 V. The ratio of the discharge capacity of the respective batteries under at −5° C. to the discharge capacity thereof at 20° C. was defined as "capacity ratio".

(Evaluation on Exothermic Property)

After charging to a charged voltage of 4.2 V at a constant current of 10 A under an environment of −5° C., a constant voltage charge was performed at a constant voltage of 4.2 V until a terminal current of 0.26 A. After batteries were hold for 20 minutes in the same environment, a constant current discharge was performed at a constant current of 20 A until a terminal voltage of 2.0 V. The aforementioned charging and discharging cycle with 20-minute suspension interval was repeated ten times. Thereafter, a nail with a diameter of 3 mm was allowed to penetrate the respective batteries with a penetration speed of 5 mm/s under an environment of 50° C. The batteries with surface temperature thereof over 130° C. were determined as overheated batteries. The number of overheated batteries per 5 batteries in each Example was defined as "overheated batteries".

(Evaluation on Cycle Characteristic)

After charging to a charged voltage of 4.2 V at a constant current of 10 A under an environment of −5° C., a constant voltage discharge was performed at a constant voltage of 4.2 V until a terminal current of 0.26 A. After batteries were hold for 20 minutes in the same environment, a constant current discharge was performed at a constant current of 20 A until a terminal voltage of 2.0 V. The aforementioned charging and discharging cycle with 20-minute suspension interval was repeated a certain number of times to measure the capacity retaining rate. The result on the capacity retaining rate at the two-hundredth cycle relative to the first cycle was defined as "cycle retaining rate".

The results on Examples 1 through 18 are shown in Table 1.

TABLE 1

| | EC vol. ratio (%) | EMC vol. ratio (%) | DMC vol. ratio (%) | $LiPF_6$ concentration (mol/L) | positive electrode theoretical capacity (mAh/cm²) | positive electrode mixture layer pore vol. ratio (%) | negative electrode capacity (mAh/g) | separator thickness (μm) | evaluation parameter capacity ratio (%) | overheated batteries | cycle retaining rate (%) |
|---|---|---|---|---|---|---|---|---|---|---|---|
| Ex1 | 15 | 15 | 70 | 1.4 | 3.7 | 25 | 250 | 20 | 80 | 0/5 | 80 |
| Ex2 | 10 | 15 | 75 | 1.4 | 3.7 | 25 | 250 | 20 | 80 | 0/5 | 80 |
| Ex3 | 20 | 15 | 65 | 1.4 | 3.7 | 25 | 250 | 20 | 75 | 0/5 | 80 |
| Ex4 | 15 | 10 | 75 | 1.4 | 3.7 | 25 | 250 | 20 | 75 | 0/5 | 80 |
| Ex5 | 15 | 20 | 65 | 1.4 | 3.7 | 25 | 250 | 20 | 75 | 0/5 | 80 |
| Ex6 | 15 | 15 | 70 | 1.3 | 3.7 | 25 | 250 | 20 | 75 | 0/5 | 80 |
| Ex7 | 15 | 15 | 70 | 1.5 | 3.7 | 25 | 250 | 20 | 75 | 0/5 | 80 |
| Ex8 | 15 | 15 | 70 | 1.4 | 3.0 | 25 | 250 | 20 | 75 | 0/5 | 80 |
| Ex9 | 15 | 15 | 70 | 1.4 | 4.5 | 25 | 250 | 20 | 75 | 0/5 | 80 |
| Ex10 | 15 | 15 | 70 | 1.4 | 3.7 | 25 | 200 | 20 | 50 | 5/5 | 70 |
| Ex11 | 15 | 15 | 70 | 1.4 | 3.7 | 25 | 220 | 20 | 75 | 0/5 | 80 |
| Ex12 | 15 | 15 | 70 | 1.4 | 3.7 | 25 | 290 | 20 | 75 | 0/5 | 80 |
| Ex13 | 15 | 15 | 70 | 1.4 | 3.7 | 25 | 300 | 20 | 50 | 2/5 | 70 |
| Ex14 | 15 | 15 | 70 | 1.4 | 3.7 | 25 | 250 | 15 | 75 | 0/5 | 80 |
| Ex15 | 15 | 15 | 70 | 1.4 | 3.7 | 25 | 250 | 18 | 80 | 0/5 | 80 |
| Ex16 | 15 | 15 | 70 | 1.4 | 3.7 | 25 | 250 | 25 | 80 | 0/5 | 80 |

TABLE 1-continued

|  | EC vol. ratio (%) | EMC vol. ratio (%) | DMC vol. ratio (%) | LiPF$_6$ concentration (mol/L) | positive electrode theoretical capacity (mAh/cm$^2$) | positive electrode mixture layer pore vol. ratio (%) | negative electrode capacity (mAh/g) | separator thickness (μm) | evaluation parameter | | |
|---|---|---|---|---|---|---|---|---|---|---|---|
|  |  |  |  |  |  |  |  |  | capacity ratio (%) | overheated batteries | cycle retaining rate (%) |
| Ex17 | 15 | 15 | 70 | 1.4 | 3.7 | 25 | 250 | 30 | 75 | 0/5 | 80 |
| Ex18 | 15 | 15 | 70 | 1.4 | 3.7 | 30 | 250 | 20 | 75 | 0/5 | 80 |

The non-aqueous electrolyte secondary batteries in Examples 1 through 9, 11 through 12, and 14 through 18 show superior evaluation results on discharge characteristic, exothermic property, and cycle characteristic. The evaluation results show that the batteries in these Examples have superior balance between exothermic property and battery characteristics.

The non-aqueous electrolyte secondary batteries in Examples 3 through 9 show slightly lower discharge characteristics, as compared with those in Examples 1 and 2. Regarding Examples 3 through 5, it is conceived that the viscosity of the electrolyte solution was increased due to a low DMC volume ratio, with the result that diffusion resistance of lithium ions was slightly increased. In Example 6, it is conceived that concentration polarization of lithium ions was slightly increased due to a low concentration of the electrolyte in the electrolyte solution. In Examples 7, on the other hand, it is conceived the viscosity of the electrolyte solution was increased due to a high concentration of the electrolyte in the electrolyte solution. In Example 8, it is conceived that since the theoretical capacity per unit area of the positive electrode was as low as 3.0 mAh/cm$^2$, the positive electrode mixture layer thickness was decreased and the weight of the mixture layer was unstable, which caused reaction fluctuation. In Example 9, on the other hand, it is conceived that since the theoretical capacity per unit area of the positive electrode was large, reaction resistance was increased.

The non-aqueous electrolyte secondary batteries in Examples 10 and 13 show lower evaluation results on discharge characteristic and exothermic property, as compared with those in Examples 11 and 12. In Example 10, it is conceived that a small capacity of the negative electrode reduced the moving velocity of lithium ions due to the excessive existence of the negative electrode active material, which increased lithium metal deposition on the negative electrode surface. In Example 13, it is conceived that a large capacity of the negative electrode degraded lithium ion acceptance characteristic of the negative electrode, which increased lithium metal deposition.

The non-aqueous electrolyte secondary batteries in Examples 14 and 17 show slightly lower discharge characteristics, as compared with those in Examples 15 and 16. In Example 14, it is conceived that a small thickness of the separator lowered the retaining force for the electrolyte solution, which increased the diffusion resistance of the electrolyte solution. In Example 17, on the other hand, it is conceived that a large thickness of the separator increased the moving distance of lithium ions, which increased the diffusion resistance of lithium ions.

The non-aqueous electrolyte secondary battery in Example 18 shows slightly lower discharge characteristic, as compared with that in Example 1. In Example 18, it is conceived that a pore volume ratio of the positive electrode mixture layer was as large as 30%, which slightly increased electron resistance between the positive electrode active materials.

Table 2 shows results on Comparative Examples 1 through 8.

TABLE 2

|  | EC vol. ratio (%) | EMC vol. ratio (%) | DMC vol. ratio (%) | LiPF$_6$ concentration (mol/L) | positive electrode theoretical capacity (mAh/cm$^2$) | positive electrode mixture layer pore vol. ratio (%) | negative electrode capacity (mAh/g) | separator thickness (μm) | evaluation parameter | | |
|---|---|---|---|---|---|---|---|---|---|---|---|
|  |  |  |  |  |  |  |  |  | capacity ratio (%) | overheated batteries | cycle retaining rate (%) |
| C Ex1 | 5 | 15 | 80 | 1.4 | 3.7 | 25 | 250 | 20 | 80 | 0/5 | 50 |
| C Ex2 | 25 | 15 | 60 | 1.4 | 3.7 | 25 | 250 | 20 | 50 | 3/5 | 80 |
| C Ex3 | 15 | 5 | 80 | 1.4 | 3.7 | 25 | 250 | 20 | 0 | 0/5 | 0 |
| C Ex4 | 15 | 25 | 60 | 1.4 | 3.7 | 25 | 250 | 20 | 50 | 3/5 | 70 |
| C Ex5 | 15 | 15 | 70 | 1.2 | 3.7 | 25 | 250 | 20 | 50 | 3/5 | 80 |
| C Ex6 | 15 | 15 | 70 | 1.6 | 3.7 | 25 | 250 | 20 | 50 | 3/5 | 70 |
| C Ex7 | 15 | 15 | 70 | 1.4 | 2.5 | 25 | 250 | 20 | 50 | 3/5 | 80 |
| C Ex8 | 15 | 15 | 70 | 1.4 | 5.0 | 25 | 250 | 20 | 50 | 3/5 | 80 |

The non-aqueous electrolyte secondary battery in Comparative Example 1 having an EC volume ratio lower than 10% shows intolerable cycle characteristic degradation. Conceivably, this is because dissociation of LiPF$_6$ in a low temperature condition was insufficient, which obstructed charging and discharging. Regarding the non-aqueous electrolyte secondary battery in Comparative Example 2 with an EC volume ratio exceeding 20%, the non-aqueous electrolyte secondary battery in Comparative Example 4 with an EMC volume ratio exceeding 20%, the non-aqueous electrolyte secondary battery in Comparative Example 5 with an LiPF$_6$ concentration lower than 1.30 mol/L, the non-aqueous electrolyte secondary battery in Comparative Example 6 with an LiPF$_6$ concentration exceeding 1.50 mol/L, the non-aqueous electrolyte secondary battery in Comparative Example 7 with a theoretical capacity per unit area of the positive electrode lower than 3.0 mAh/cm², and the non-aqueous electrolyte secondary battery in Comparative Example 8 with the theoretical capacity per unit area of the positive electrode exceeding 4.5 mAh/cm², all the above non-aqueous electrolyte secondary batteries in Comparative Examples show intolerable discharge characteristic degradation, and likely caused lithium metal decomposition on the negative electrode surfaces, thereby showing low evaluation results on exothermic property. In the non-aqueous electrolyte secondary battery in Comparative Example 3 with an EMC volume ratio lower than 10%, charging and discharging were disabled. This is because the electrolyte solution was coagulated at −5° C.

As described above, an aspect of the invention is directed to a non-aqueous electrolyte secondary battery comprising a positive electrode, a negative electrode, a separator, and a non-aqueous electrolyte solution, wherein the positive electrode has a theoretical capacity per unit area from 3.0 to 4.5 mAh/cm²; the non-aqueous electrolyte solution contains ethylene carbonate (EC), ethylmethyl carbonate (EMC), and dimethyl carbonate (DMC) as solvents, and $LiPF_6$ as an electrolyte; volume ratios of the three solvents relative to all the solvents in the non-aqueous electrolyte solution are respectively 10 to 20% for EC, 10 to 20% for EMC, and 60 to 80% for DMC; and a concentration of the $LiPF_6$ is from 1.30 to 1.50 mol/L.

With the above arrangement, in the non-aqueous electrolyte secondary battery for use in high-rate specifications having a large electrode area of attaining the theoretical capacity per unit area of the positive electrode from 3.0 to 4.5 mAh/cm², the moving velocity of lithium ions in the electrolyte solution can be increased by adding a low viscous DMC from 60 to 80% in volume ratio as a solvent, in addition to the EC and the EMC in the non-aqueous electrolyte solution; and by controlling the concentration of the $LiPF_6$ from 1.30 to 1.50 mol/L, which is effective to lower the increased coagulation point of the electrolyte solution due to a large volume ratio of DMC. Thereby, the balance between the moving velocity of lithium ions in the electrolyte solution, and the reaction velocity of lithium ions in the positive electrode can be retained. Thus, the arrangement provides a non-aqueous electrolyte secondary battery with superior battery characteristics, which enables to suppress lithium metal deposition on the negative electrode surface even by high-rate charging and discharging, or high-power discharging under a low temperature of 0° C. or below.

Preferably, in the non-aqueous electrolyte secondary battery, the positive electrode may include a positive electrode mixture layer containing, as a positive electrode active material, a lithium-containing composite oxide expressed by $LiM_xO_y$ where x and y satisfy $1 \leq x \leq 2$ and $2 \leq y \leq 4$, and M is at least one selected from the group consisting of Co, Ni, Mn, Fe, Al, v and Ti. With the above arrangement, the reaction velocity of lithium ions in the positive electrode can be sufficiently increased in high-rate charging and discharging, or high-power discharging.

Preferably, in the non-aqueous electrolyte secondary battery, the positive electrode may include a positive electrode mixture layer containing a positive electrode active material, and the positive electrode mixture layer may have a pore volume ratio from 24 to 31%. This enables to further enhance reactivity of lithium ions, thereby improving large current discharge performance.

Preferably, in the non-aqueous electrolyte secondary battery, the negative electrode may include a negative electrode mixture layer containing a carbon material as a negative electrode active material. This enables to maintain life property of the negative electrode at a high level.

Preferably, in the non-aqueous electrolyte secondary battery, the negative electrode may have a capacity "A/B" from 220 to 290 mAh/g where A is the capacity of the battery, and B is the weight of the carbon material. This arrangement allows for maintaining battery reliability and battery characteristics at higher levels.

Preferably, in the non-aqueous electrolyte secondary battery, the separator may have a thickness from 18 to 25 μm. This arrangement enables to keep both the battery capacity and the battery characteristics at higher levels.

Preferably, in the non-aqueous electrolyte secondary battery, the positive electrode and the negative electrode may be rolled up with the separator being disposed between the positive electrode and the negative electrode, into a cylindrical shaped electrode assembly. This arrangement enables to suppress lithium metal deposition even by high-rate charging and discharging, or high power discharging in a low temperature condition, which is further advantageous in providing the effects of the invention.

This application is based on Japanese Patent Application No. 2005-236276 filed on Aug. 17, 2005, the contents of which are hereby incorporated by reference.

Although the present invention has been fully described by way of example with reference to the accompanying drawing, it is understood that various changes and modifications will be apparent to those skilled in the art. Therefore, unless otherwise such changes and modifications depart from the scope of the present invention hereinafter defined, they should be construed as being included therein.

What is claimed is:

1. A non-aqueous electrolyte secondary battery comprising a positive electrode, a negative electrode, a separator, and a non-aqueous electrolyte solution, wherein
   the positive electrode has a theoretical capacity per unit area from 3.0 to 4.5 mAh/cm²;
   the non-aqueous electrolyte solution contains solvents consisting of ethylene carbonate, ethylmethyl carbonate, and dimethyl carbonate, and $LiPF_6$ as an electrolyte;
   volume ratios of the three solvents relative to a total of the three solvents in the non-aqueous electrolyte solution are respectively 10 to 20 % for the ethylene carbonate, 10 to 20 % for the ethylmethyl carbonate, and 60 to 80 % for the dimethyl carbonate, in which a volume ratio of the dimethyl carbonate to the ethylmethyl carbonate is in a range from 3.25 to 7.50; and
   a concentration of the $LiPF_6$ is from 1.30 to 1.50 mol/L.

2. The non-aqueous electrolyte secondary battery according to claim 1, wherein
   the positive electrode includes a positive electrode mixture layer containing, as a positive electrode active material, a lithium-containing composite oxide expressed by $LiM_xO_y$ where x and y satisfy $1 \leq x \leq 2$ and $2 \leq y \leq 4$, and M is at least one selected from the group consisting of Co, Ni, Mn, Fe, Al, V, and Ti.

3. The non-aqueous electrolyte secondary battery according to claim 1, wherein
   the positive electrode includes a positive electrode mixture layer containing a positive electrode active material, and the positive electrode mixture layer has a pore volume ratio from 24 to 31%.

4. The non-aqueous elecirolyte secondary battery according to claim 1, wherein
   the negative electrode includes a negative electrode mixture layer containing a carbon material as a negative electrode active material.

5. The non-aqueous electrolyte secondary battery according to claim 4, wherein
the negative electrode has a capacity "A/B" from 220 to 290 mAh/g where A is the capacity of the battery, and B is the weight of the carbon material.

6. The non-aqueous electrolyte secondary battery according to claim 1, wherein
the separator has a thickness from 18 to 25 μm.

7. The non-aqueous electrolyte secondary battery according to claim 1, wherein
the positive electrode and the negative electrode are rolled up with the separator disposed between the positive electrode and the negative electrode, into a cylindrical-shaped electrode assembly.

* * * * *